United States Patent
Lin et al.

(10) Patent No.: US 11,580,356 B2
(45) Date of Patent: Feb. 14, 2023

(54) EFFICIENT INFERENCING WITH PIECEWISE POINTWISE CONVOLUTION

(71) Applicant: QUALCOMM Incorporated, San Diego, CA (US)

(72) Inventors: Jamie Menjay Lin, San Diego, CA (US); Jin Won Lee, San Diego, CA (US); Jilei Hou, San Diego, CA (US)

(73) Assignee: Qualcomm Incorporated, San Diego, CA (US)

(*) Notice: Subject to any disclaimer, the term of this patent is extended or adjusted under 35 U.S.C. 154(b) by 391 days.

(21) Appl. No.: 16/932,496

(22) Filed: Jul. 17, 2020

(65) Prior Publication Data
US 2021/0019593 A1    Jan. 21, 2021

Related U.S. Application Data (60) Provisional application No. 62/876,297, filed on Jul. 19, 2019.

(51) Int. Cl.
| | |
|---|---|
| G06F 17/15 | (2006.01) |
| G06N 3/04 | (2023.01) |
| G06K 9/62 | (2022.01) |
| G06F 11/30 | (2006.01) |

(52) U.S. Cl.
CPC ........... *G06N 3/04* (2013.01); *G06F 11/3058* (2013.01); *G06F 17/15* (2013.01); *G06K 9/6267* (2013.01)

(58) Field of Classification Search
CPC ........ G06N 3/04; G06N 3/084; G06N 3/0454; G06F 11/3058; G06F 17/15; G06K 9/6267; G06V 10/764; G06V 10/82; G06V 20/582; G06V 20/584; G06V 20/588
See application file for complete search history.

(56) References Cited

U.S. PATENT DOCUMENTS

| | | | |
|---|---|---|---|
| 2009/0024378 A1* | 1/2009 | Dierickx | G06F 30/3323 703/13 |
| 2019/0266283 A1* | 8/2019 | Shukla | G06N 20/00 |

FOREIGN PATENT DOCUMENTS

WO    WO-2021051049 A1 *    3/2021

\* cited by examiner

*Primary Examiner* — Michael A Keller
(74) *Attorney, Agent, or Firm* — Patterson & Sheridan, L.L.P (57) ABSTRACT

Certain aspects of the present disclosure provide techniques for performing piecewise pointwise convolution, comprising: performing a first piecewise pointwise convolution on a first subset of data received via a first branch input at a piecewise pointwise convolution layer of a convolutional neural network (CNN) model; performing a second piecewise pointwise convolution on a second subset of data received via a second branch input at the piecewise pointwise convolution layer; determining a piecewise pointwise convolution output by summing a result of the first piecewise pointwise convolution and a result of the second piecewise pointwise convolution; and providing the piecewise pointwise convolution output to a second layer of the CNN model.

22 Claims, 10 Drawing Sheets

EFFICIENT INFERENCING WITH PIECEWISE POINTWISE CONVOLUTION

CROSS-REFERENCE TO RELATED APPLICATIONS

This Application claims the benefit of U.S. Provisional Patent Application No. 62/876,297, filed on Jul. 19, 2019, the entire contents of which are incorporated herein by reference.

INTRODUCTION

Aspects of the present disclosure relate to optimizing machine learning model performance, and in particular to improving the efficiency of pointwise convolutions.

Machine learning generally produces a trained model (e.g., an artificial neural network, a tree, or other structures), which represents a generalize fit to a set of training data that is known a priori. Applying the trained model to new data produces inferences, which may be used to gain insight into the new data. In some cases, applying the model to the new data is described as "running an inference" on the new data.

Creating inferences is computationally intensive, especially as model complexity increases, such as with convolutional neural network models. Accordingly, what are needed are methods of improving the performance of machine learning models, such as by making inferencing more efficient with neural network models.

BRIEF SUMMARY

Certain embodiments provide a method for performing piecewise pointwise convolution, comprising: performing a first piecewise pointwise convolution on a first subset of data received via a first branch input at a piecewise pointwise convolution layer of a convolutional neural network (CNN) model; performing a second piecewise pointwise convolution on a second subset of data received via a second branch input at the piecewise pointwise convolution layer; determining a piecewise pointwise convolution output by summing a result of the first piecewise pointwise convolution and a result of the second piecewise pointwise convolution; and providing the piecewise pointwise convolution output to a second layer of the CNN model.

Certain embodiments further provide a processing system, comprising: a memory comprising computer-executable instructions; a first processor configured to execute the computer-executable instructions and cause the processing system to: perform a first piecewise pointwise convolution on a first subset of data received via a first branch input at a piecewise pointwise convolution layer of a convolutional neural network (CNN) model; perform a second piecewise pointwise convolution on a second subset of data received via a second branch input at the piecewise pointwise convolution layer; determine a piecewise pointwise convolution output by summing a result of the first piecewise pointwise convolution and a result of the second piecewise pointwise convolution; and provide the piecewise pointwise convolution output to a second layer of the CNN model.

Certain embodiments further provide a non-transitory computer-readable medium comprising instructions that, when executed by a first processor of a processing system, cause the processing system to perform a method, the method comprising: performing a first piecewise pointwise convolution on a first subset of data received via a first branch input at a piecewise pointwise convolution layer of a convolutional neural network (CNN) model; performing a second piecewise pointwise convolution on a second subset of data received via a second branch input at the piecewise pointwise convolution layer; determining a piecewise pointwise convolution output by summing a result of the first piecewise pointwise convolution and a result of the second piecewise pointwise convolution; and providing the piecewise pointwise convolution output to a second layer of the CNN model.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Aspects of the present disclosure provide apparatuses, methods, processing systems, and computer-readable mediums for optimizing machine learning model performance, and in particular for improving the efficiency of pointwise convolutions, such as may be used when processing neural network models (e.g., convolutional neural network models).

Deep Neural Networks and Deep Learning

Deep learning architectures may perform complex tasks, such as object recognition, by learning to represent inputs at successively higher levels of abstraction in each layer, thereby building up a useful feature representation of the input data. In this way, deep learning addresses a major bottleneck of traditional machine learning.

Prior to the advent of deep learning, a machine learning approach for a task may have relied heavily on human engineered features, perhaps in combination with a shallow classifier. A shallow classifier may be, for example, a two-class linear classifier in which a weighted sum of input values (e.g., input vector components) may be compared with a threshold to predict to which class the input belongs. Human engineered features may be templates or kernels tailored to a specific problem domain by engineers with domain expertise.

Deep learning architectures, in contrast, may learn to represent features that are similar to what a human engineer might design, but through training. Furthermore, a neural network model (e.g., a deep neural network) may learn to represent and recognize new types of features that a human might not have considered.

A deep learning architecture may be configured to learn a hierarchy of features. For example, if presented with visual data, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. For example, in feed-forward networks, information is passed from lower to higher layers, with each neuron in a given layer communicating to neurons in higher layers.

Neural networks may also have recurrent or feedback (also called top-down) connections. A connection from the output of a neuron in a given layer to another neuron in the same layer is called a recurrent connection. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Generally, the connections between layers of a neural network may be fully connected or locally connected.

Figure 1A:
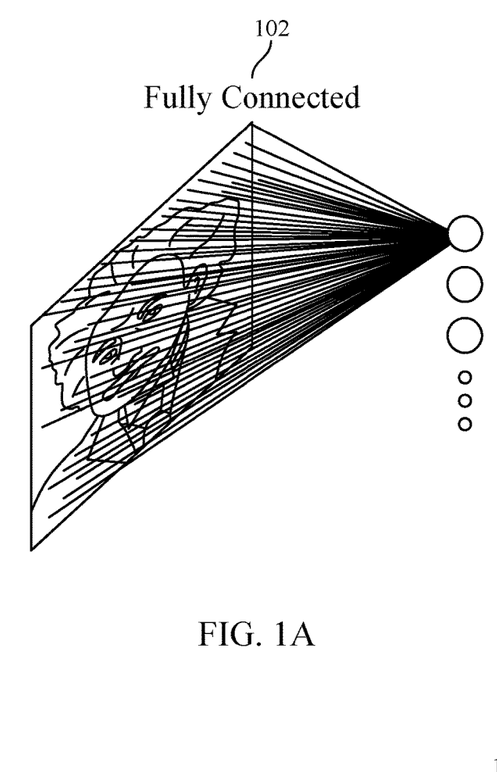
FIGS. 1A-1D depict examples of various aspects of neural network models.

FIG. 1A illustrates an example of a fully connected neural network 102. In a fully connected neural network 102, a neuron in a first layer may communicate its output to every neuron in a second layer, so that each neuron in the second layer will receive input from every neuron in the first layer.

Figure 1B:
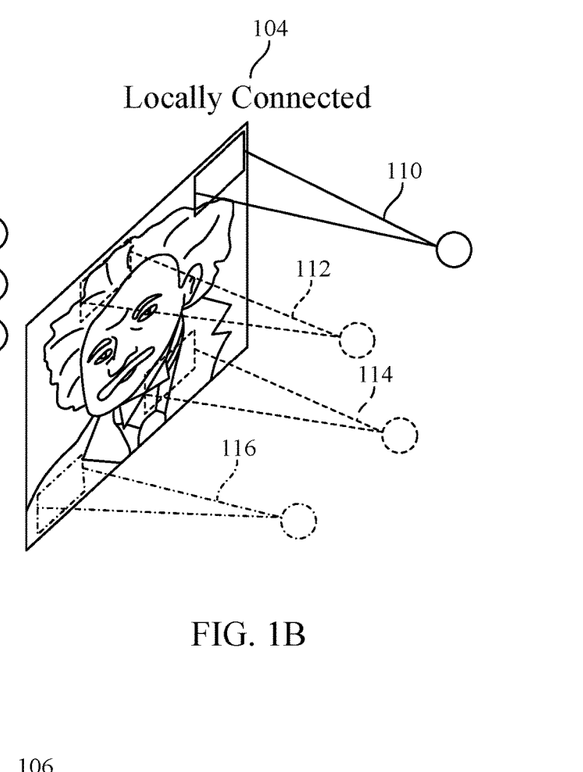

FIG. 1B illustrates an example of a locally connected neural network 104. In a locally connected neural network 104, a neuron in a first layer may be connected to a limited number of neurons in the second layer. More generally, a locally connected layer of the locally connected neural network 104 may be configured so that each neuron in a layer will have the same or a similar connectivity pattern, but with connections strengths that may have different values (e.g., 110, 112, 114, and 116). The locally connected connectivity pattern may give rise to spatially distinct receptive fields in a higher layer, because the higher layer neurons in a given region may receive inputs that are tuned through training to the properties of a restricted portion of the total input to the network.

Figure 1C:
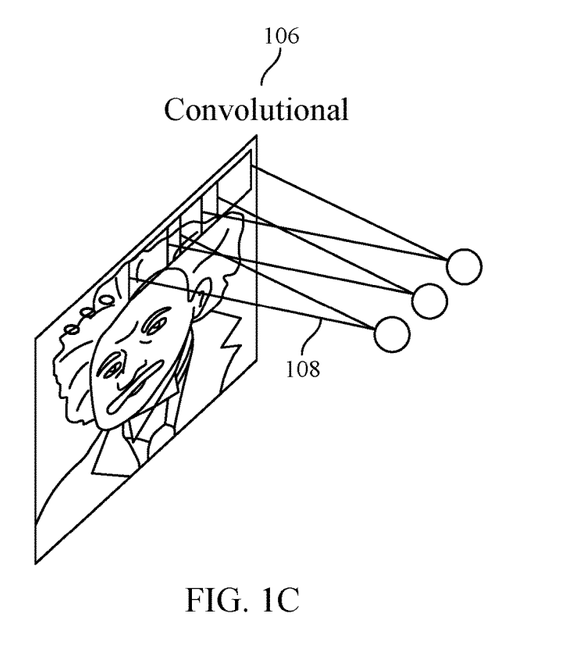

One example of a locally connected neural network is a convolutional neural network. FIG. 1C illustrates an example of a convolutional neural network 106. The convolutional neural network 106 may be configured such that the connection strengths associated with the inputs for each neuron in the second layer are shared (e.g., 108). Convolutional neural networks may be well suited to problems in which the spatial location of inputs is meaningful.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map receiving input from a range of neurons in the previous layer and from each of the multiple channels. The values in the feature map may be further processed with a non-linear activation function, such as a rectification, max(0, x). Values from adjacent neurons may be further pooled, which corresponds to down sampling, and may provide additional local invariance and dimensionality reduction.

One type of convolutional neural network is a deep convolutional network (DCN). Deep convolutional networks (DCNs) are networks of convolutional layers, configured with additional pooling and normalization layers. DCNs can be trained using supervised learning in which both the input and output targets are known for many exemplars and are used to modify the weights of the network by use of, for example, gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

Figure 1D:
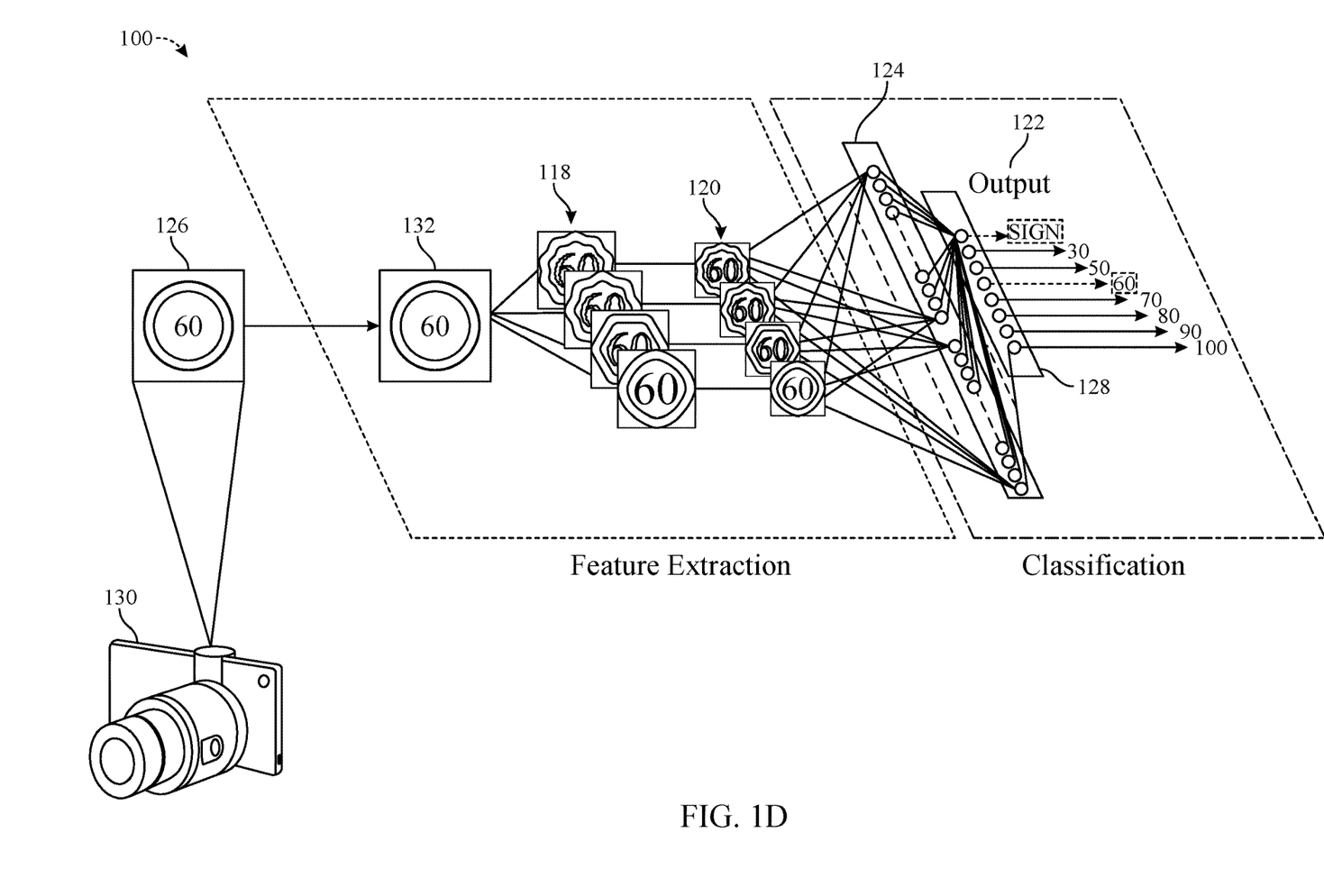

FIG. 1D illustrates a detailed example of a DCN 100 designed to recognize visual features from an image 126 input from an image capturing device, such as a car-mounted camera 130. The DCN 100 of the current example may be trained to identify traffic signs and a number provided on the traffic sign. Of course, the DCN 200 may be trained for other tasks, such as identifying lane markings or identifying traffic lights. These are just some example tasks, and many others are possible.

DCN 100 may be trained with supervised learning. During training, the DCN 100 may be presented with an image, such as the image 126 of a speed limit sign, and a forward pass may then be computed to produce an output 122.

In this example, DCN 100 includes a feature extraction section and a classification section. Upon receiving the image 126, a convolutional layer 132 applies convolutional kernels (not shown) to the image 126 to generate a first set of feature maps 118. In one example, the convolutional kernel for the convolutional layer 132 may be a 5×5 kernel that generates 28×28 feature maps. Further in the present example, because four different feature maps are generated in the first set of feature maps 118, four different convolutional kernels are applied to the image 126 at the convolutional layer 132. The convolutional kernels may also be referred to as filters or convolutional filters. Notably, this is just one example and many other configurations of kernels and filters are possible The first set of feature maps 118 may then be subsampled by a pooling layer (e.g., a max pooling layer, not shown) to generate a second set of feature maps 120. The pooling layer may reduce the size of the first set of feature maps 118 while maintain much of the information in order to improve model performance. For example, the second set of feature maps 120 may be down-sampled to 14×14 from 28×28 by the pooling layer.

This process may be repeated through many layers. In other words, the second set of feature maps 120 may be further convolved via one or more subsequent convolutional layers (not shown) to generate one or more subsequent sets of feature maps (not shown).

In the example of FIG. 1D, the second set of feature maps 120 is reshaped to generate a first set of nodes 124 (e.g., in a fully connected layer). Furthermore, the first set of nodes 124 is further connected to a second set of nodes 128 (e.g., another fully connected layer). Each node in the second set of nodes 128 may include a number that corresponds to a possible feature of the image 126, such as "sign," "60," and "100."

A softmax function (not shown) may convert the numbers in the fourth feature map 128 into a probability in order that an output 122 of DCN 100 is one or more probabilities of the image 126 including one or more features, such as a sign with the numbers "60" on it, as in input image 126. Thus, in the present example, the probabilities in the output 122 for "sign" and "60" should be higher than the probabilities of the others of the output 122, such as "30," "40," "50," "70," "80," "90," and "100".

Before training DCN 100, the output 122 produced by DCN 100 may be incorrect. Thus, an error may be calculated between the output 122 and a target output known a priori. For example, here the target output is an indication that the image 126 includes a "sign" and the number "60". Utilizing the known, target output, the weights of DCN 100 may then be adjusted through training so that subsequent output 122 of DCN 100 achieves the target output.

To adjust the weights of DCN 100, a learning algorithm may compute a gradient vector for the weights. The gradient may indicate an amount that an error would increase or decrease if a weight were adjusted in a particular way. The weights may then be adjusted to reduce the error. This manner of adjusting the weights may be referred to as "back propagation" as it involves a "backward pass" through the layers of DCN 100.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level.

After training, DCN 100 may be presented with new images and DCN 100 may generate inferences, such as classifications, or probabilities of various features being in the new image.

Notably, the configuration of DCN 100 is just one example, and many other configurations are possible. For example, additional connections, such as skip connectors or recurrent connections, may be added in other examples.

Further, the example application described with respect to FIG. 1D is just one possible application, and many other are possible.

Figure 2:
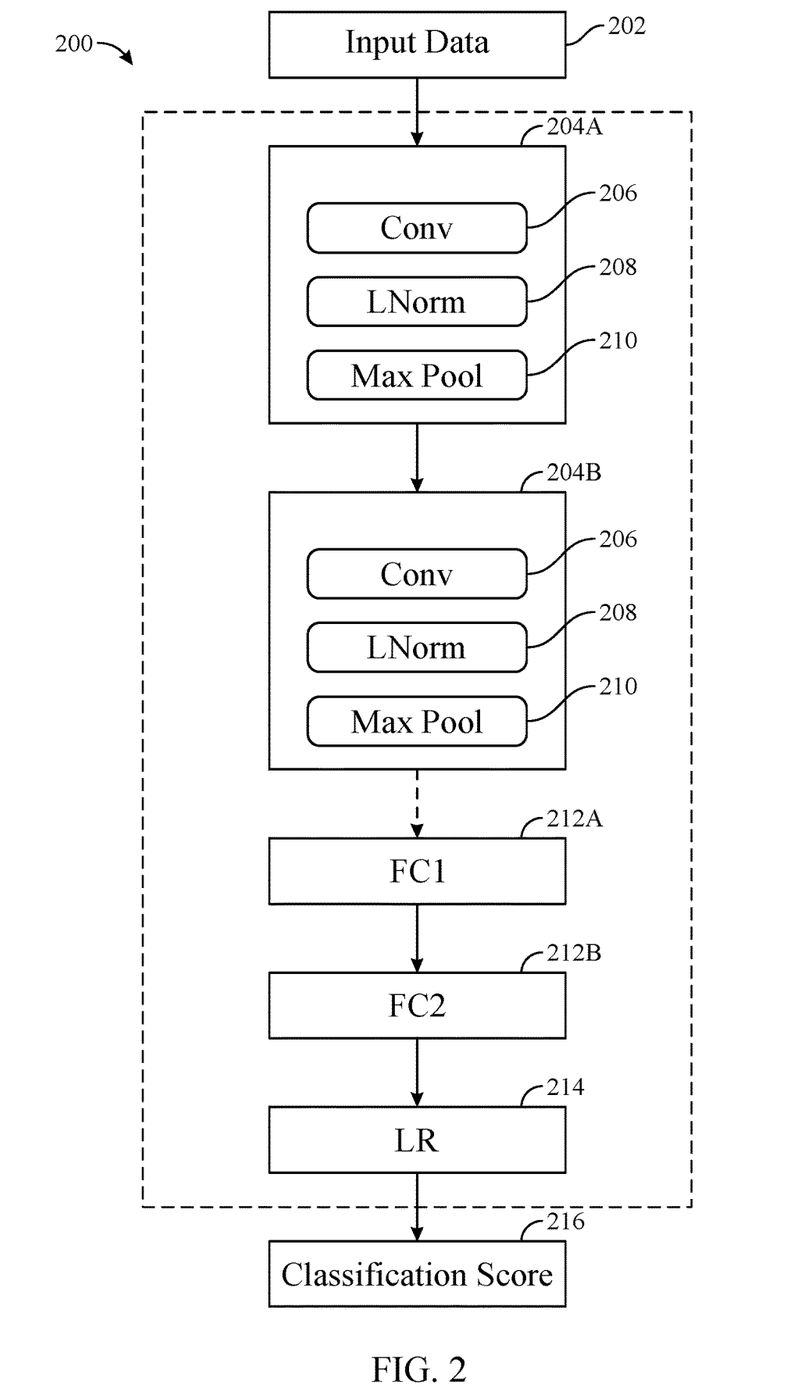
FIG. 2 is a block diagram illustrating an example of a deep convolutional neural network model.

FIG. 2 is a block diagram illustrating an exemplary deep convolutional network 200. The deep convolutional network 200 may include multiple different types of layers based on connectivity and weight sharing. As shown in FIG. 2, the deep convolutional network 200 includes the convolution blocks 204A and 204B. Each of the convolution blocks 204A and 204B may be configured with a convolution layer (CONV) 206, a normalization layer (LNorm) 208, and a max pooling layer (MAX POOL) 210.

The convolution layers 206 may include one or more convolutional filters, which may be applied to the input data 202 to generate a feature map. Although only two convolution blocks 204A and 204B are shown, the present disclosure is not so limiting, and instead, any number of convolution blocks (e.g., blocks 204A and 204B) may be included in the deep convolutional network 200 according to design preference. The normalization layer 208 may normalize the output of the convolution filters. For example, the normalization layer 208 may provide whitening or lateral inhibition. The max pooling layer 210 may provide down sampling aggregation over space for local invariance and dimensionality reduction.

The parallel filter banks, for example, of a deep convolutional network may be loaded onto one or more processors of a processing device, such as described below with respect to FIGS. 8 and 9, to achieve high performance and low power consumption.

The deep convolutional network 200 may also include one or more fully connected layers, such as layer 212A (labeled "FC1") and layer 212B (labeled "FC2"). The deep convolutional network 200 may further include a logistic regression (LR) layer 214. Between each layer 206, 208, 210, 212, 214 of the deep convolutional network 200 are weights (not shown) that are to be updated. The output of each of the layers (e.g., 206, 208, 210, 212, and 214) may serve as an input of a succeeding one of the layers (e.g., 206, 208, 210, 212, and 214) in the deep convolutional network 200 to learn hierarchical feature representations from input data 202 (e.g., images, audio, video, sensor data, and/or other input data) supplied at the first of the convolution blocks 204A. The output of the deep convolutional network 200 is a classification score 216 for the input data 202. The classification score 216 may be a set of probabilities, where each probability is the probability of the input data including a feature from a set of features.

Pointwise Convolution in Convolutional Networks

Pointwise convolution generally uses a 1×1×d kernel that iterates through every single point in, for example, an input image of depth d. The depth d of a pointwise convolution kernel generally matches the number of channels of the input data, such as an image with multiple channels for color data. So, for example, iterating a 1×1×5 kernel through an 8×8×5 image results in an 8×8×1 image output.

Multiple (e.g., n) pointwise convolution kernels can be used to increase the number of output channels of input data. So, using input image data as an example, n=256 1×1×5 kernels can be generated, which each output an 8×8×1 image, and these output images can be stacked to get a resulting image of 8×8×256, i.e., an image 8 pixels wide by 8 pixels tall with a depth of 256 channels. The resulting increase in output channels provides more parameters for training, which may improve a model's ability to identify features (e.g., in an input image).

Pointwise convolution is often used as one part of a depthwise separable convolution process that separates a "normal" convolution into a depthwise convolution and a pointwise convolution. This separation gives the advantage of producing substantially the same output as compared to a normal convolution with far fewer mathematical operations, which improves the efficiency of processing through the convolution neural network model.

Generally, an activation layer, such as ReLU, PReLU, Softmax, or others, can be applied after every layer of a neural network. Applying 1×1×d kernels and adding activation layer after the kernel may give a network added depth, which may increase its performance.

Consider a pointwise (1×1) convolution that takes P activations from input X and produces Q activations as output Y. In such a generic pointwise convolution operation, P*Q multiplications between the inputs (X) and weights (W) are involved. Thus:

$$Y=WX, \text{ where } X \in R^P, W \in R^{Q*P}, \text{ and } Y \in R^Q.$$

Figure 3:
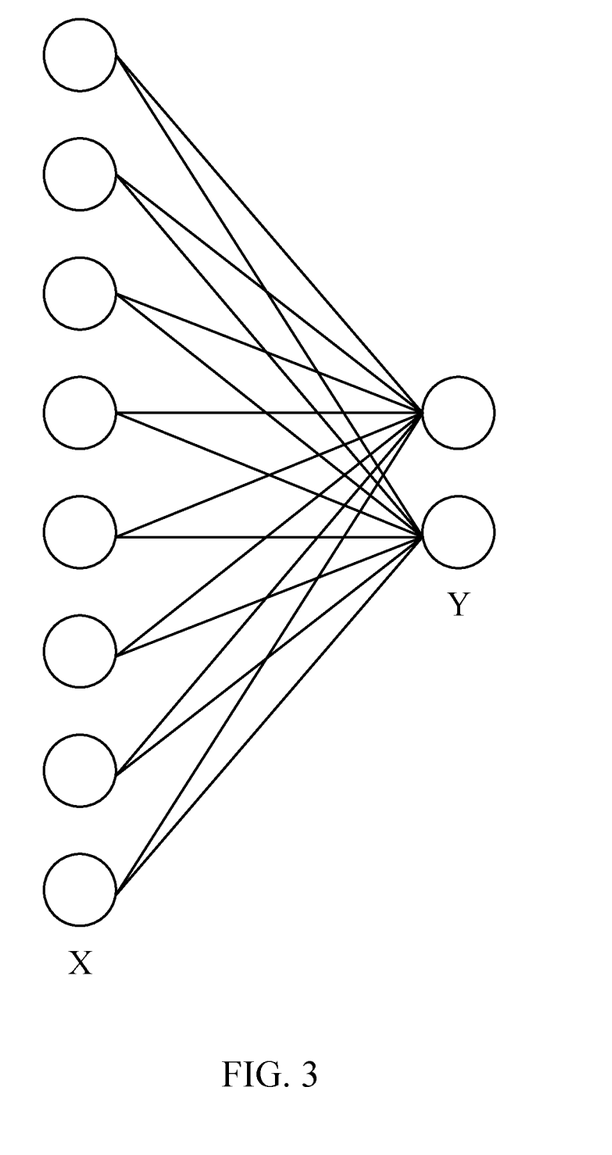
FIG. 3 depicts an example of inputs and output activations.

Typically, such pointwise convolution operations may start when all P activations of X are derived from their previous layer. FIG. 3 depicts an example with P=8 input activations and Q=2 output activations.

Concatenation of Pointwise Convolution Activations

Figure 4:
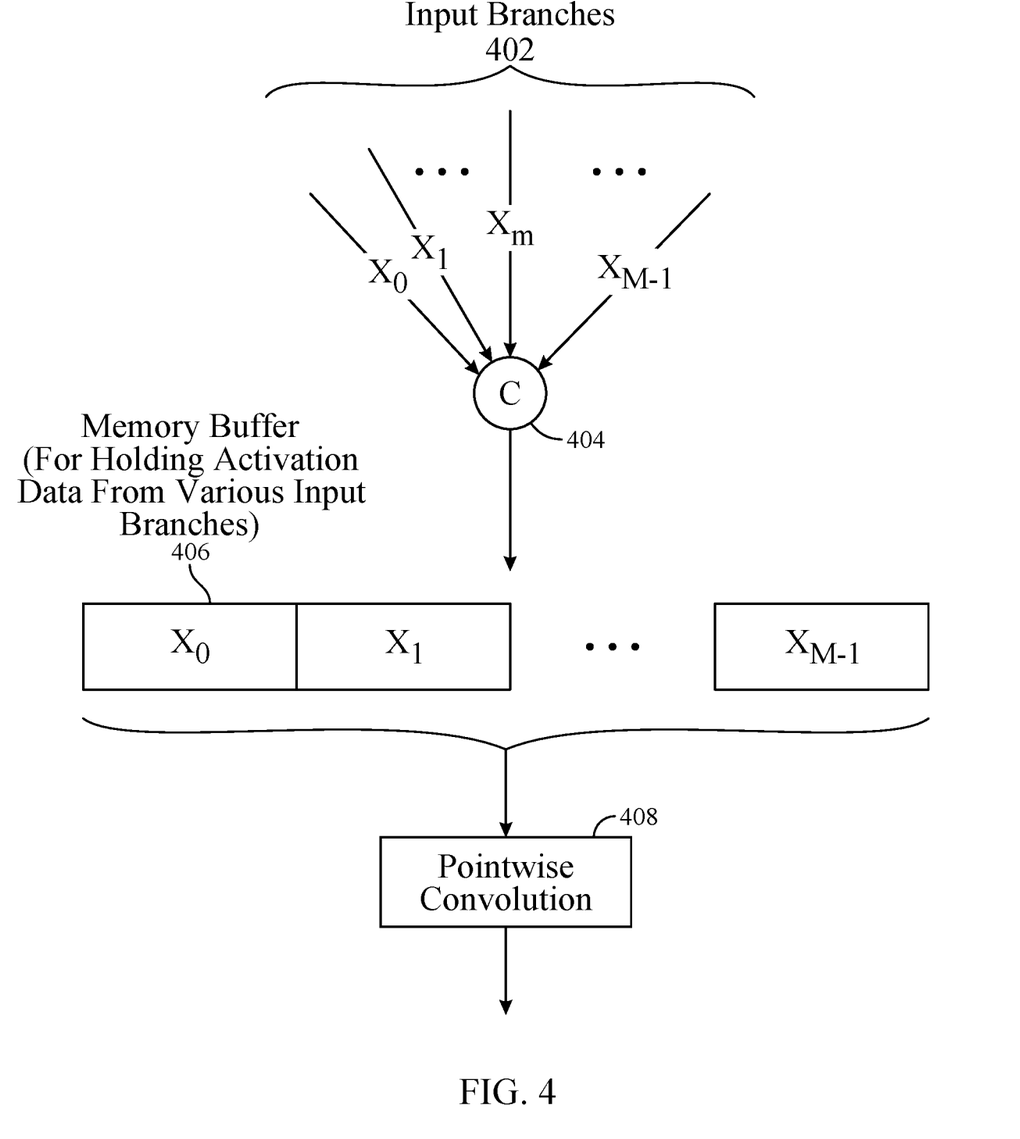
FIG. 4 depicts an example of memory usage for concatenation when performing pointwise convolution.

Convolutional neural network model design may involve the use of concatenation of multiple branches in hidden layers. For example, in some convolutional neural network model designs, concatenation of activations reaching from multiple scaling operations and stages is desirable in order to achieve high accuracy performance. One approach to handle multi-branch concatenation is to use a memory buffer to store each of the activations (e.g., $X_m$, $m \in \{0, 1, \ldots, M-1\}$) from their respective sources, which is depicted in FIG. 4. As soon as all needed activations are collected from the various input branches 402, a concatenation 404 can be performed by reading out activations from the memory buffer 406 in a proper order to make them available as input to a following pointwise convolution operation 408.

While concatenation and pointwise convolution methods work in their intended neural network functionality, they are not necessarily efficient. In fact, for M>1, especially when M is a relatively larger number, the memory consumption of conventional concatenation methods becomes considerably large, which directly impacts the peak memory consumption of the system running the model. Such peak memory consumption may exceed stringent resource requirements in resource-sensitive model design, such as those running on embedded systems for low-power applications. Examples of low-power applications that may execute convolutional models and therefore benefit from piecewise pointwise convolution include internet of things (IoT) applications, always on (AON) applications, biometric feature detection (e.g., face detection, fingerprint identification, etc.), human presence detection, environmental condition and surroundings change detection, object detection/classification, and many others. Existing convolution algorithms and existing neural network frameworks (e.g., TensorFlow, Caffe2) often fail to support the stringent resource efficiency demands for lower power applications, particularly with respect to activation and peak memory efficiency.

Additionally, conventional concatenation methods require an implicit "synchronization" for availability of activations from all M branches (e.g., 402). Consequently, a branch having its activations available sooner than another branch would not be able to move on to the next stage of processing. Rather, the system executing the model will be able to move on to the next stage of processing only when activations from all M branches are available. Execution efficiency is therefore impacted due to the wait time, even if resources in the following stage(s) have become available.

Thus, conventional concatenation methods used with pointwise convolution suffer from inefficient memory consumption (which also impacts power consumption due to memory data access) and inefficient execution time (which also impacts power consumption due to longer awake time).

Efficient Piecewise Pointwise Convolution Methods

To address the efficiency problems created by conventional concatenation methods used with pointwise convolution, piecewise pointwise convolution methods may be used instead with convolutional neural network models.

In a first aspect of such methods, an activation partitioning operation may be performed. Activation partitioning may be defined for a given integer parameter M, such that:

$$P_{0/M}(T) \cup P_{1/M}(T) \cup \ldots \cup PP_{(M-1)/M}(T)=T \quad (1)$$

$$P_{i/M}(T) \cap P_{j/M}(T)=\emptyset, \text{ for any } i,j \in \{0,1, \ldots, M-1\} \text{ and } i \neq j \quad (2)$$

In definitions (1) and (2), above, T is a tensor, P( ) is a partitioning function, i and j are input branch indices, M is the total number of piecewise input branches, and ∪ is a union operator. Tensor T can be either an activation tensor X or a model weight tensor W. A valid partitioning function P( ) on a tensor T must satisfy both definitions (1) and (2) above.

Activation partitioning based on the above definitions has the following properties:

$$(T) \subset T \quad (3)$$

$$(P_{i/M}(T) \cup P_{j/M}(T))X = P_{i/M}(T)*P_{i/M}(X) + P_{j/M}(T)*P_{j/M}(X),$$
$$\text{for any } i,j \in \{0,1, \ldots, M-1\} \text{ and } i \neq j \quad (4)$$

Note in the above properties (3) and (4) that for $i \in \{0, 1, \ldots, M-1\}$, $P_{i/M}(W)$ for a weight tensor and $P_{i/M}(X)$ for an activation tensor share the same subset of partitioned channel indices.

Thus, given an activation tensor X, a weight tensor W, and a valid partitioning function P( ) and based on properties (3) and (4), above, of activation partitioning, the following is derived:

$$Y=WX \quad (5)$$

$$Y=(P_{0/M}(W) \cup P_{1/M}(W) \cup \ldots \cup_{(M-1)/M}(W)) \quad (6)$$

$$Y=P_{0/M}(W)*P_{0/M}(X)+P_{1/M}(W)*P_{1/M}(X)+ \ldots +_{(M-1)/M}(W)*_{(M-1)/M}(X) \quad (7)$$

$$Y=\Sigma_{m=0}^{m=M-1} P_{m/M}(W)*P_{m/M}(X) \quad (8)$$

As depicted above in the progression of equivalent equations from (5)-(8), given the definitions (1) and (2) and properties (3) and (4) of the partitioning function P( ), Y=WX may be equivalently computed by breaking the operations involving the activation tensor and weight tensor into piecewise branches (m) of pointwise convolutions.

Notably, with piecewise pointwise convolution, a multi-branch model architecture no longer needs to "synchronize"

across the m input branches for activation concatenation. Instead, the model may take individual branches of activations and perform piecewise pointwise convolution, one branch after another. The results of each piecewise pointwise convolution may be summed to reach the same result as a conventional pointwise convolution using concatenation.

Figure 5:
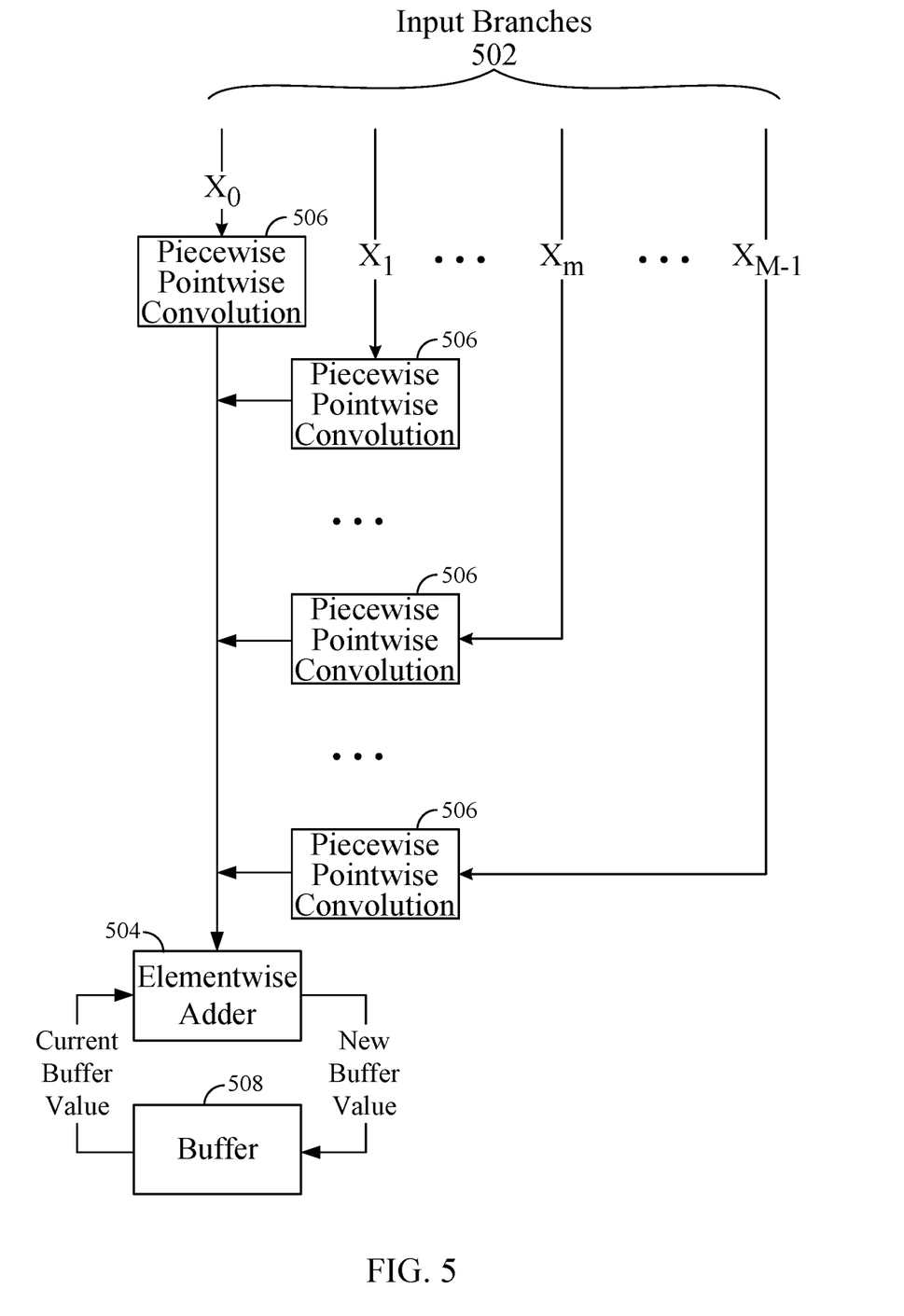
FIG. 5 depicts an example of memory usage when performing piecewise pointwise convolution.

FIG. 5 depicts an example of the flow of a piecewise pointwise convolution. In particular, piecewise pointwise convolutions 506 are performed on each input branch 502 as the activation data on that input branch becomes available. The result of each piecewise pointwise convolution 506 is accumulated with the contents of memory buffer 508 by in-place elementwise adder 504. Once all of the piecewise pointwise convolutions 506 are complete for all of the input branches 502 ($X_0 \ldots X_{M-1}$ in this example), the resulting accumulated value in buffer 508 is the same as in a conventional pointwise convolution. However, buffer 508 can be significantly smaller than a conventional buffer for pointwise convolutions because it need only hold be large enough to store an accumulated value for the piecewise pointwise convolutions, rather than individual outputs (e.g., activations) for each piecewise pointwise convolution 506 until all input branches 502 are complete, as in a conventional pointwise convolution. Notably, buffer 508 may be reset between each set of piecewise pointwise convolutions, such as to a starting value of zero.

Elementwise adder 504 is a type of summation operator, which in this example performs elementwise summation between tensors of same dimensions (or shape), such that the value stored in buffer 508 may be summed (or accumulated) with a piecewise pointwise convolution output (e.g., from piecewise pointwise convolutions 506) in an elementwise fashion, and the elementwise summed result is stored back to the buffer (i.e., in-place).

So, for example, at the beginning of a piecewise pointwise convolution procedure, buffer 508 may be initialized to all 0's. Note that in this example, buffer 508 holds an output tensor, which is typically a tensor instead of a single scalar. Then assume a piecewise pointwise convolution procedure begins and all M piecewise pointwise convolution outputs become available sequentially. In other words, in this example, the piecewise pointwise convolution output based on $X_0$ is available first, then $X_1$ becomes available, and then so on until $X_{M-1}$.

As soon as the output of the piecewise pointwise convolution on the $X_0$ branch becomes available, it is added via an in-place elementwise summation to the current value of buffer 508 (which is all 0's at this point) via elementwise adder 504 and stored back in buffer 508.

Then, when the output of the piecewise pointwise convolution on the $X_1$ branch becomes available, it is added via an in-place elementwise summation to the current value of buffer 508 via elementwise adder 504 and stored back in buffer 508. So at this point buffer 508 includes the elementwise sum of the outputs of the piecewise pointwise convolutions of the $X_0$ and $X_1$ branches. This same procedure is repeated for all the branches through $X_{M-1}$, i.e., M times in this example.

Note that the piecewise pointwise convolutions of the various branches need not happen in sequential order as they can be accumulated by elementwise adder 504 in any order and reach the same result.

Beneficially, with piecewise pointwise convolution, there is no longer a need for a large memory to simultaneously hold M branches of activation data. As depicted, a single memory buffer 508 may be used for piecewise pointwise convolution. Testing on example models has shown 75% reduction in peak memory consumption. Thus, memory efficiency is improved compared to conventional methods. Similarly, because the memory accesses (e.g., write and read transactions) can be significantly reduced, power consumption is also reduced compared to conventional convolution methods. Further, with piecewise pointwise convolution, since there is no longer need to synchronize across all M branches for availability of activation for concatenation, at any moment when a branch of activations become available, the neural network can compute one piecewise branch (e.g., $X_m$) of activations to derive piecewise output for that branch.

Additionally, since there is no longer need to synchronize across all M branches, whenever a branch of activations becomes available, and as long as the compute resource is available for the next stage of processing (e.g., ASIC engine), the neural network model can immediately move on with piecewise pointwise convolution for that branch without waiting on availability of other branches. Thus, execution time is improved compared to conventional methods.

Thus, in FIG. 5, the piecewise pointwise convolutions for input branches $X_0$ to $X_{M-1}$ can be handled in any order as they become available. This is particularly useful when the branches are handled by different processors of a processing system, such as described below with respect to FIGS. 8 and 9. Because this may reduce overall awake time of a compute resource, power consumption is further reduced compared to conventional methods.

Example Neural Network Utilizing Piecewise Pointwise Convolution

Figure 6:
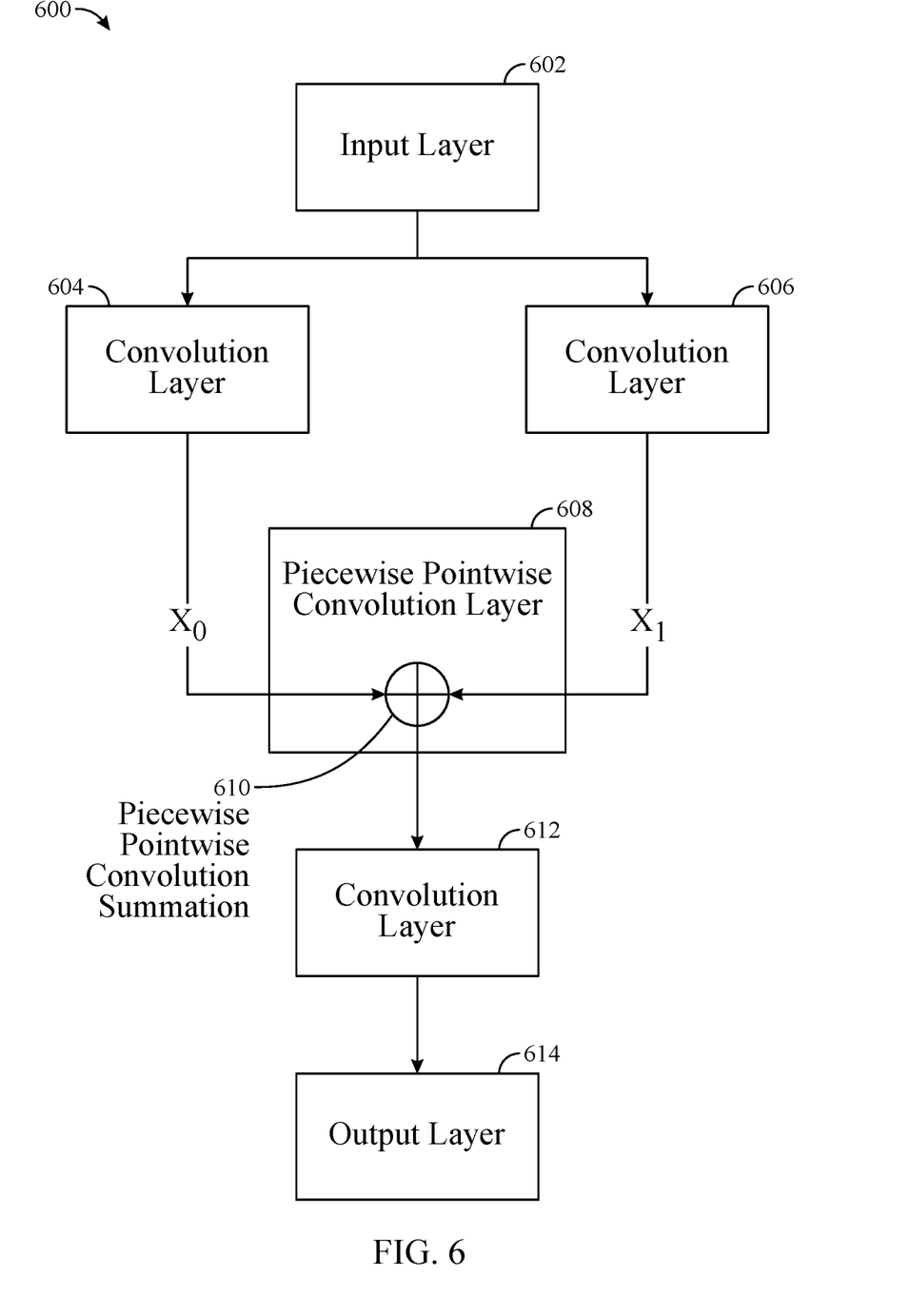
FIG. 6 depicts an example neural network model utilizing piecewise pointwise convolution.

FIG. 6 depicts an example neural network 600 utilizing piecewise pointwise convolution. In this example, model input data is provided via input layer 602 to a first convolution layer 604 and a second convolution layer 606.

Convolution layer 604 processes the input data from layer 602 and outputs activation data, $X_0$, to piecewise pointwise convolution layer 608 such that it forms an input branch for layer 608. Similarly, convolution layer 606 processes the input data from layer 602 and outputs activation data, $X_1$, to piecewise pointwise convolution layer 608, such that it forms a second input branch for layer 608. Layer 608 may be described as having a multi-branch (or layer) dependency because it requires the activation outputs from more than one branch in order to process its layer.

Piecewise pointwise convolution layer 608 processes the activation data, $X_0$ and $X_1$, without regard to when and in which order it is received. The results of each piecewise pointwise convolution (e.g., of $X_0$ and $X_1$ in this example) is summed (e.g., as shown at 610). When all input branches are complete, layer 608 outputs its activation data to convolution layer 612.

With conventional concatenation, layer 608 would require saving the activation outputs $X_0$ and $X_1$ individually (as in the example depicted in FIG. 4) until both were ready so that the outputs could be synchronized as an input into layer 608. As described above, this is not necessary for piecewise pointwise convolution layer 608.

The output from pointwise convolution layer 612 is then provided to output layer 614.

Notably, FIG. 6 is just one simple example of a convolution neural network model design to illustrate the concepts described herein, and any many other designs are possible.

Example Method for Performing Piecewise Pointwise Convolution

Figure 7:
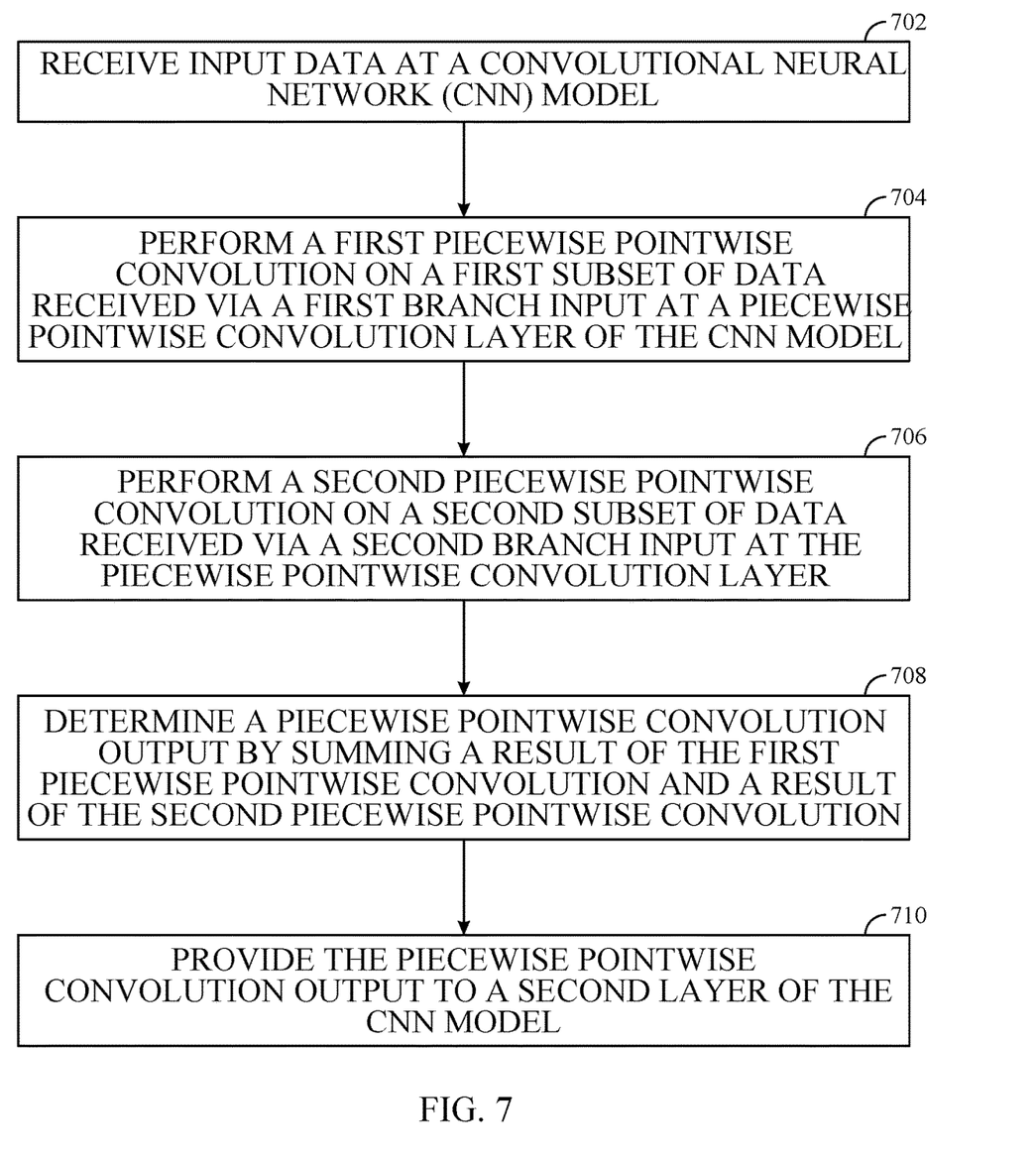
FIG. 7 depicts an example method for performing piecewise pointwise convolution.

FIG. 7 depicts an example method 700 for performing piecewise pointwise convolution.

Method 700 begins at step 702 with receiving input data at a convolutional neural network (CNN) model.

Method 700 then proceeds to step 704 with performing a first piecewise pointwise convolution on a first subset of data received via a first branch input at a piecewise pointwise convolution layer of the CNN model.

Method 700 then proceeds to step 706 with performing a second piecewise pointwise convolution on a second subset of data received via a second branch input at the piecewise pointwise convolution layer.

Notably, the first and second subsets of data need not be subsets of the input data received at the CNN model as branching, such as in a piecewise pointwise convolution layer, may happen in any layer of the CNN. For example, the input data received at the CNN may be processed through various layers prior to reaching a piecewise pointwise convolution layer.

Method 700 then proceeds to step 708 with determining a piecewise pointwise convolution output by summing a result of the first piecewise pointwise convolution and a result of the second piecewise pointwise convolution.

Method 700 then proceeds to step 710 with providing the piecewise pointwise convolution output to a second layer of the CNN model.

In some embodiments of method 700, the piecewise pointwise convolution output Y is determined according to $Y=\Sigma_{m=0}^{m=M-1} P_{m/M}(W)*P_{m/M}(X)$, wherein W is a weight tensor, X is an activation tensor, and M is the number of input branches to the piecewise pointwise convolution layer.

In some embodiments, method 700 further comprises: storing the result of the first piecewise pointwise convolution in a portion of a memory; and overwriting the portion of the memory with the sum of the first piecewise pointwise convolution and the second piecewise pointwise convolution (such as depicted in FIG. 5).

In some embodiments, method 700 further comprises: generating a model output from the CNN model; and providing the model output generated to a low-power application running on a mobile electronic device.

In some embodiments of method 700, a first processor performs the first piecewise pointwise convolution, and a second processor performs the second piecewise pointwise convolution. For example, a first processor may be one of the processors described with respect to FIGS. 8 and/or 9, below.

Figure 8:
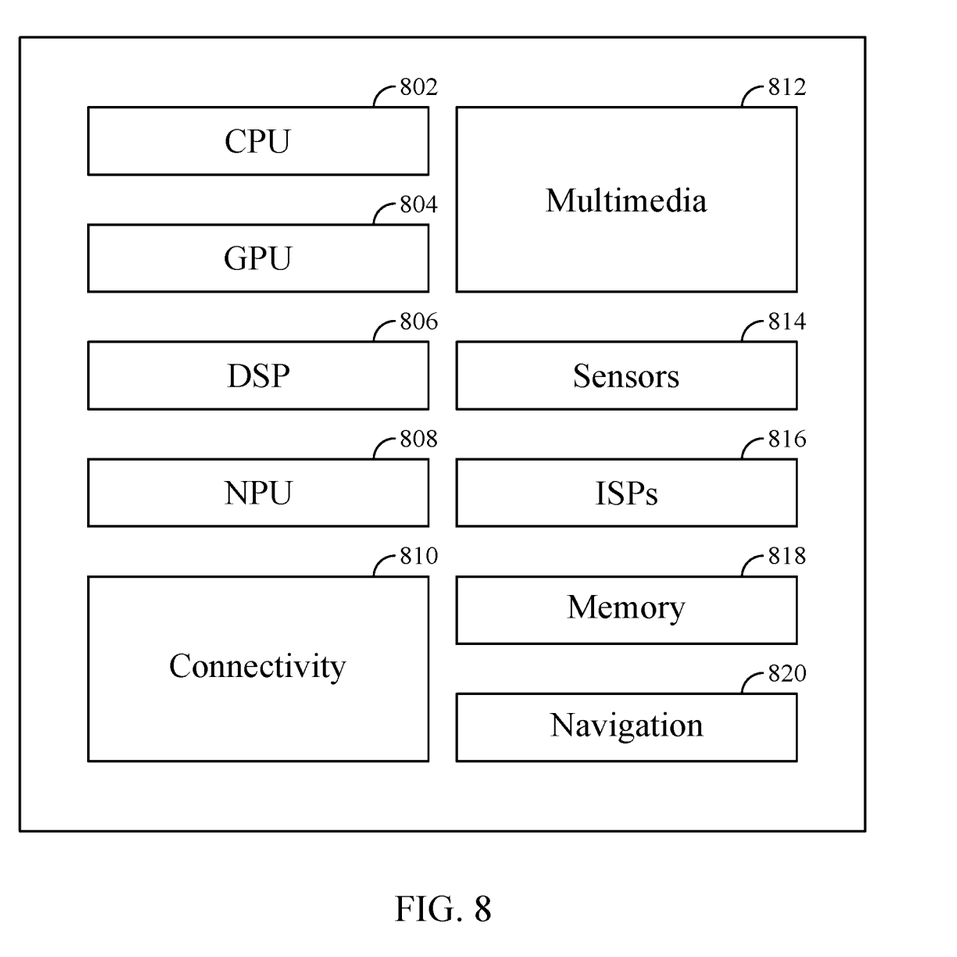
FIG. 8 illustrates an example implementation of a processing system that may be configured to perform various aspects described herein.

In some embodiments of method 700, the input data is received from a sensor in a mobile electronic device (e.g., one of sensors 814 in FIG. 8). In some embodiments, the input data is associated with an application running on the mobile electronic device and configured for at least one of: biometric feature detection, human presence detection, environmental condition detection, object detection, or object classification.

In some embodiments of method 700, the input data is image data and/or audio data.

Example Processing Systems for Optimizing Machine Learning Model Performance

FIG. 8 illustrates an example processing system 800, which may be configured to perform the various aspects described herein, including for example, method 700 described with respect to FIG. 7. In some embodiments, processing system 800 may be implemented as a system on a chip (SOC).

In various embodiments, processing system 800 may include a central processing unit (CPU) 802 or a multi-core CPU configured to perform a piecewise pointwise convolution, in accordance with certain aspects of the present disclosure.

In some embodiments, variables (e.g., neural signals and model weights), system parameters associated with a computational device, and the like may be stored in a memory block associated with a neural processing unit (NPU) 808, in a memory block associated with a CPU 802, in a memory block associated with a graphics processing unit (GPU) 804, in a memory block associated with a digital signal processor (DSP) 806, in a memory block 818, or may be distributed across multiple blocks. Instructions executed at the CPU 802 may be loaded from a program memory associated with the CPU 802 or may be loaded from a memory block 818.

Memory block 818 may store instructions comprising various components as means for performing various functions described herein. For example, memory block 818 may comprise a receiving component, a performing component, a determining component, a providing component, a storing component, an overwriting component, a generating component, and other components. For example, the aforementioned components may provide means for performing the functions described with respect to method 700 of FIG. 7.

The processing system 800 may also include additional processing blocks tailored to specific functions, such as a GPU 804, a DSP 806, a connectivity block 810, which may include fifth generation (5G) connectivity, fourth generation long term evolution (4G LTE) connectivity, Wi-Fi connectivity, USB connectivity, Bluetooth connectivity, and the like, and a multimedia processor 812 that may, for example, detect and recognize gestures. In one implementation, the NPU is implemented in the CPU 802, DSP 806, and/or GPU 804.

The processing system 800 may also include one or more sensor processors 814 associated with any manner of sensor, one or more image signal processors (ISPs) 816, and/or a navigation module 820, which may include a global positioning system.

In some embodiments, the processing system 800 may be based on an ARM or RISC instruction set.

Processing system 800 and/or components thereof may be configured to perform the methods described herein.

Figure 9:
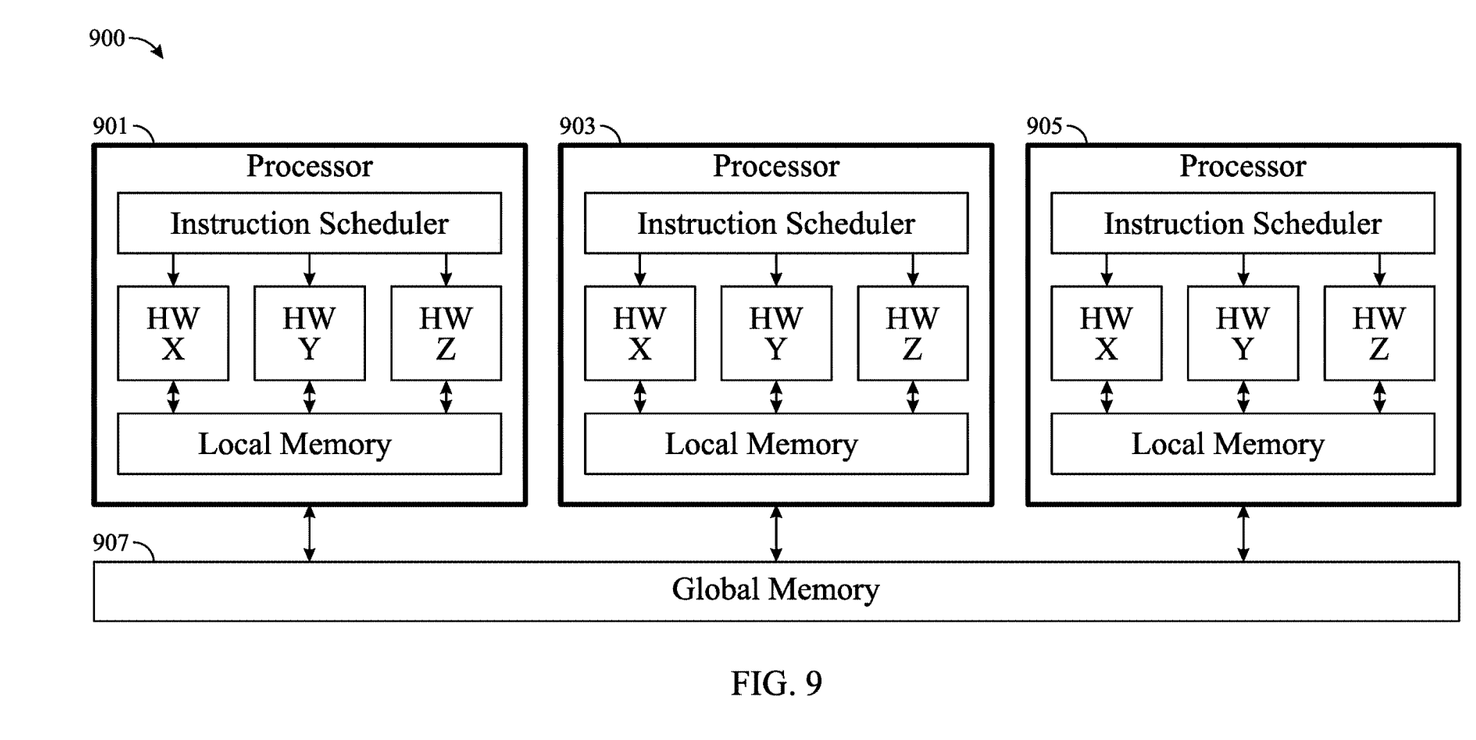
FIG. 9 depicts an example schematic diagram of a multiprocessor processing system that may be configured to perform various aspects described herein.

FIG. 9 depicts an example schematic diagram of a multi-processor processing system 900 that may be configured to perform aspects described herein, including for example, method 700 described with respect to FIG. 7. In some embodiments, the various processors 901, 903, and 905 may be associated with processors described with respect to FIG. 8 (e.g., CPU 802, GPU 804, DSP, 806, NPU 808, and the like).

In this example, system 900 includes processors 901, 903, and 905, but in other examples, any number of individual processors may be used. Further, though depicted similarly, processors 901, 903, and 905 may be representative of various different kinds of processors in an electronic device, such as CPUs, GPUs, DSPs, NPUs, and the like as described herein.

Each of processors 901, 903, and 905 includes an instruction scheduler, various hardware sub-components (e.g., hardware X, hardware Y, and hardware Z), and a local memory. The local memory may be a tightly coupled memory (TCM). Note that the components of each of processors 901, 903, and 905 is shown as the same in this example, each of the processors may have different hardware configurations, different hardware elements, etc.

Each of processors 901, 903, and 905 is also in data communication with a global memory, such as a DRAM (e.g., DDR DRAM) memory, or other types of volatile working memory.

In some implementations, in a multi-processor processing system such as 900, one of the processors may act as a master processor. For example, processor 901 may be a master processor in this example. A master processor may include a compiler that, when executed, can determine how a model, such as a neural network, will be processed by various components of processing system 900.

For example, hardware parallelism may be implemented by mapping portions of the processing of a model to various hardware (e.g., hardware X, hardware Y, and hardware Z) within a given processor (e.g., processor 901) as well as mapping portions of the processing of the model to other processors (e.g., processors 903 and 905) and their associated hardware.

In one example, input branches of a piecewise pointwise convolution may be processed by different processors (e.g., 901, 903, and/or 905) so that the piecewise pointwise convolutions may be performed in parallel.

Example Clauses

Clause 1: A method, comprising: performing a first piecewise pointwise convolution on a first subset of data received via a first branch input at a piecewise pointwise convolution layer of a convolutional neural network (CNN) model; performing a second piecewise pointwise convolution on a second subset of data received via a second branch input at the piecewise pointwise convolution layer; determining a piecewise pointwise convolution output by summing a result of the first piecewise pointwise convolution and a result of the second piecewise pointwise convolution; and providing the piecewise pointwise convolution output to a second layer of the CNN model.

Clause 2: The method of Clause 1, wherein the piecewise pointwise convolution output, Y, is determined according to $Y = \sum_{m=0}^{m=M-1} P_{m/M}(W) * P_{m/M}(X)$, wherein W is a weight tensor, X is an activation tensor, and M is a number of input branches to the piecewise pointwise convolution layer.

Clause 3: The method of any one of Clauses 1-2, further comprising: storing the result of the first piecewise pointwise convolution in a portion of a memory; and overwriting the portion of the memory with a sum of the first piecewise pointwise convolution and the second piecewise pointwise convolution.

Clause 4: The method of any one of Clauses 1-3, further comprising: generating a model output from the CNN model; and providing the model output generated to a low-power application running on a mobile electronic device.

Clause 5: The method of any one of Clauses 1-4, wherein: a first processor performs the first piecewise pointwise convolution, and a second processor performs the second piecewise pointwise convolution.

Clause 6: The method of any one of Clauses 1-5, wherein the input data is one of image data or audio data.

Clause 7: The method of any one of Clauses 1-6, wherein: the input data is received from a sensor in a mobile electronic device, and the input data is associated with an application running on the mobile electronic device and configured for at least one of: biometric feature detection, human presence detection, environmental condition detection, object detection, or object classification.

Clause 8: A processing system, comprising: a memory comprising computer-executable instructions; and one or more processors configured to execute the computer-executable instructions and cause the processing system to perform a method in accordance with any one of Clauses 1-7.

Clause 9: A non-transitory computer-readable medium comprising computer-executable instructions that, when executed by one or more processors of a processing system, cause the processing system to perform a method in accordance with any one of Clauses 1-7.

Clause 10: A computer program product embodied on a computer-readable storage medium comprising code for performing a method in accordance with any one of Clauses 1-7.

Additional Considerations

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method, comprising:
performing a first piecewise pointwise convolution on a first subset of data received via a first branch input at a piecewise pointwise convolution layer of a convolutional neural network (CNN) model;
performing a second piecewise pointwise convolution on a second subset of data received via a second branch input at the piecewise pointwise convolution layer;
determining a piecewise pointwise convolution output by summing a result of the first piecewise pointwise convolution and a result of the second piecewise pointwise convolution; and
providing the piecewise pointwise convolution output to a second layer of the CNN model.

2. The method of claim 1, wherein the piecewise pointwise convolution output, Y, is determined according to $Y=\Sigma_{m=0}^{m=M-1} P_{m/M}(W)*P_{m/M}(X)$, wherein W is a weight tensor, X is an activation tensor, and M is a number of input branches to the piecewise pointwise convolution layer.

3. The method of claim 1, further comprising:
storing the result of the first piecewise pointwise convolution in a portion of a memory; and
overwriting the portion of the memory with a sum of the first piecewise pointwise convolution and the second piecewise pointwise convolution.

4. The method of claim 1, further comprising:
generating a model output from the CNN model; and
providing the model output generated to a low-power application running on a mobile electronic device.

5. The method of claim 1, wherein:
a first processor performs the first piecewise pointwise convolution, and
a second processor performs the second piecewise pointwise convolution.

6. The method of claim 1, wherein the input data is one of image data or audio data.

7. The method of claim 1, wherein:
the input data is received from a sensor in a mobile electronic device, and
the input data is associated with an application running on the mobile electronic device and configured for at least one of: biometric feature detection, human presence detection, environmental condition detection, object detection, or object classification.

8. A processing system, comprising:
a memory comprising computer-executable instructions;
a first processor configured to execute the computer-executable instructions and cause the processing system to:
perform a first piecewise pointwise convolution on a first subset of data received via a first branch input at a piecewise pointwise convolution layer of a convolutional neural network (CNN) model;
perform a second piecewise pointwise convolution on a second subset of data received via a second branch input at the piecewise pointwise convolution layer;
determine a piecewise pointwise convolution output by summing a result of the first piecewise pointwise convolution and a result of the second piecewise pointwise convolution; and
provide the piecewise pointwise convolution output to a second layer of the CNN model.

9. The processing system of claim 8, wherein the piecewise pointwise convolution output, Y, is determined according to $Y=\Sigma_{m=0}^{m=M-1} P_{m/M}(W)*P_{m/M}(X)$, wherein W is a weight tensor, X is an activation tensor, and M is a number of input branches to the piecewise pointwise convolution layer.

10. The processing system of claim 8, wherein the first processor is further configured to cause the processing system to:
store the result of the first piecewise pointwise convolution in a portion of the memory; and
overwrite the portion of the memory with a sum of the first piecewise pointwise convolution and the second piecewise pointwise convolution.

11. The processing system of claim 8, wherein the first processor is further configured to cause the processing system to:
generate a model output from the CNN model; and
provide the model output generated to a low-power application running on the processing system.

12. The processing system of claim 8, further comprising: a second processor, wherein:
the first processor performs the first piecewise pointwise convolution, and
the second processor performs the second piecewise pointwise convolution.

13. The processing system of claim 8, wherein the input data is one of image data or audio data.

14. The processing system of claim 8, further comprising: a sensor, wherein:
the input data is received from the sensor, and
the input data is associated with an application running on the processing system and configured for at least one of: biometric feature detection, human presence detection, environmental condition detection, object detection, or object classification.

15. A non-transitory computer-readable medium comprising instructions that, when executed by a first processor of a processing system, cause the processing system to perform a method, the method comprising:
performing a first piecewise pointwise convolution on a first subset of data received via a first branch input at a piecewise pointwise convolution layer of a convolutional neural network (CNN) model;
performing a second piecewise pointwise convolution on a second subset of data received via a second branch input at the piecewise pointwise convolution layer;
determining a piecewise pointwise convolution output by summing a result of the first piecewise pointwise convolution and a result of the second piecewise pointwise convolution; and
providing the piecewise pointwise convolution output to a second layer of the CNN model.

16. The non-transitory computer-readable medium of claim 15, wherein the piecewise pointwise convolution output, Y, is determined according to $Y=\Sigma_{m=0}^{m=M-1} P_{m/M}(W) * P_{m/M}(X)$, wherein W is a weight tensor, X is an activation tensor, and M is a number of input branches to the piecewise pointwise convolution layer.

17. The non-transitory computer-readable medium of claim 15, wherein the method further comprises:
storing the result of the first piecewise pointwise convolution in a portion of a memory; and
overwriting the portion of the memory with a sum of the first piecewise pointwise convolution and the second piecewise pointwise convolution.

18. The non-transitory computer-readable medium of claim 15, wherein the method further comprises:
generating a model output from the CNN model; and
providing the model output generated to a low-power application running on the processing system.

19. The non-transitory computer-readable medium of claim 15, wherein:
the first processor performs the first piecewise pointwise convolution, and
a second processor of the processing system performs the second piecewise pointwise convolution.

20. The non-transitory computer-readable medium of claim 15, wherein the input data is one of image data or audio data.

21. The non-transitory computer-readable medium of claim 15, wherein:
the input data is received from a sensor in the processing system, and
the input data is associated with an application running on the processing system and configured for at least one of: biometric feature detection, human presence detection, environmental condition detection, object detection, or object classification.

22. A processing system, comprising:
means for performing a first piecewise pointwise convolution on a first subset of data received via a first branch input at a piecewise pointwise convolution layer of a convolutional neural network (CNN) model;
means for performing a second piecewise pointwise convolution on a second subset of data received via a second branch input at the piecewise pointwise convolution layer;
means for determining a piecewise pointwise convolution output by summing a result of the first piecewise pointwise convolution and a result of the second piecewise pointwise convolution; and
means for providing the piecewise pointwise convolution output to a second layer of the CNN model.

* * * * *